(12) United States Patent
Park (10) Patent No.: US 8,812,035 B2
(45) Date of Patent: Aug. 19, 2014

(54) APPARATII AND METHODS FOR PROVIDING TEXTING SERVICES TO VOICE GRADE TELEPHONE NUMBERS

(75) Inventor: Brian Park, Clifton, VA (US)

(73) Assignee: Giimme, Inc., Sunnyvale, CA (US)

( * ) Notice: Subject to any disclaimer, the term of this patent is extended or adjusted under 35 U.S.C. 154(b) by 134 days.

(21) Appl. No.: 13/429,191

(22) Filed: Mar. 23, 2012

(65) Prior Publication Data

US 2013/0252642 A1 Sep. 26, 2013

(51) Int. Cl.
*H04W 88/02* (2009.01)

(52) U.S. Cl.
USPC .......................................... 455/466

(58) Field of Classification Search
USPC .............. 455/466, 457, 417, 552, 553, 412.1, 455/412, 2, 432, 3, 535.1, 456.1, 469.1, 455/419, 404.1, 411, 415, 418, 412.2; 705/26
See application file for complete search history.

(56) References Cited

U.S. PATENT DOCUMENTS

| 2011/0085211 A1* | 4/2011 | King et al. ..................... 358/474 |
| 2013/0013991 A1* | 1/2013 | Evans .......................... 715/206 |

* cited by examiner

*Primary Examiner* — Diane Mizrahi
(74) *Attorney, Agent, or Firm* — Utah Valley Patent (57) ABSTRACT

Apparatii to facilitate texting to both textable and non-textable telephone numbers may include a user interface module, a destination verification module, a destination selection module and a routing module. The user interface module may render a map or a list on an electronic display that includes contact information for one or more entities. The destination verification module may use the contact information to access a texting registry to determine if an entity has a texting address. In response to determining that a texting address is available for an entity, the user interface module may display a textable indicator proximate to contact information for the entity. Similarly, information from a destination field of a text message may be used to retrieve a texting address from the texting registry and route the email message to the texting address. Methods corresponding to the apparatii are also disclosed herein.

44 Claims, 9 Drawing Sheets

Deli-licious                    .32 miles
222 N Univ. Ave.
801-555-1234 [T]           14 Reviews Recipient: [801-555-1234 (Deli-licious) ▽] —705

Me: What is your special today? ←—710

Deli-licious: Rueben on Rye with chips and drink for $4.99. ←—720

Me: Can I get that to go? ←—710

Deli-licious: Yes. Please confirm the last 4 digits of the credit card number that we have on file for you. ←—720

740
1234 p.s. please add xtra mayo and mustard| ←—730

[SEND]

APPARATII AND METHODS FOR PROVIDING TEXTING SERVICES TO VOICE GRADE TELEPHONE NUMBERS

BACKGROUND OF THE INVENTION

1. Field of the Invention

The claimed inventions relate to texting services in general and apparatii and methods for providing texting services to telephone numbers that currently do not support texting services such as telephone numbers for voice grade telephone lines and handsets.

2. Description of the Related Art

Texting services such as SMS, MMS, and TMS are widely available on cellular phone networks and have proven to be a popular form of communication due to the immediate yet unobtrusive and deferrable nature of text messages. Despite these advantages, texting has been primarily limited to cell phones in general and to affiliated parties such as family members, friends and colleagues that have direct knowledge that the intended party has a cell phone that is able to receive such messages. In particular, small businesses and residences with established and published phone numbers have been unable to tap into the power of text messaging and support customer interaction with texting services despite the preference of many consumers for this convenient form of communication.

BRIEF SUMMARY OF THE INVENTION

The present invention has been developed in response to the present state of the art, and in particular, in response to the problems and needs in the art that have not yet been fully solved by currently available texting apparatii and methods. Accordingly, the claimed inventions have been developed to provide apparatii and methods for providing texting services to telephone numbers that currently do not support texting such as voice grade telephone numbers and published telephone numbers.

As described below apparatii to facilitate texting to both textable and non-textable telephone numbers may include a user interface module, a destination verification module, a destination selection module and a routing module. In one embodiment, the user interface module renders a map on an electronic display that includes graphical indicators for a plurality of entities.

The placement of the graphical indicators on the map may substantially correspond to actual locations for the entities. The graphical indicators may include a textable indicator for entities that have a texting address. Examples of entities include stores, businesses, enterprises, institutions, residences, families and individuals.

In another embodiment, the user interface module displays a list of entities to a user on an electronic display along with one or more textable indicators proximate to listings for entities that have a texting address. The texting address may be a textable phone number, an electronic messaging address or the like. The user interface module may also be configured to parse information associated with a user display for a telephone number and provide the phone number to the destination verification module.

The destination verification module may be configured to access a texting registry to determine if an entity has a texting address. The texting registry may store contact information including a contact telephone number for a plurality of entities associated with a geographic region. The destination verification module may also be configured to determine if a telephone number matches a contact telephone number within the registry and whether a texting address is associated with the contact telephone number. In response to determining that a texting address is available for an entity, the user interface module may display a textable indicator proximate to contact information for the entity.

The apparatii described herein may also include a routing module that sends text messages to texting channels corresponding to the texting addresses retrieved from the registry and a registration module that manages the registry. A variety of methods corresponding to the described apparatii are also disclosed herein.

Although a variety of embodiments of the aforementioned apparatii and methods are disclosed herein, it should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors in conjunction with a non-transitory computer readable medium. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations and devices which, when joined logically together, comprise the module and achieve the stated purpose for the module.

Indeed, a module of executable code may be a single instruction, or many instructions, and may even be distributed over several different code segments, among different programs, and across several computer readable memories and/or computational devices. Similarly, operational data may be identified and illustrated herein within modules, and may be embodied in any suitable form and organized within any suitable type of data structure. The operational data may be collected as a single data set, or may be distributed over different locations including over different computer readable storage and computational devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any non-transitory form capable of enabling execution of a program of machine-readable instructions on a digital processing apparatus. For example, a computer readable medium may be embodied by a flash drive, compact disk, digital-video disk, a magnetic tape, a Bernoulli drive, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein the phrase 'texting number', 'texting address', or 'texting destination' refers to a telephone number or the like that is used as an address for a text message regardless of whether the corresponding telephone line and handset support texting. In contrast, the phrase 'textable phone number' refers to a telephone number such as a mobile phone number that corresponds to a handset and communication channel that natively support texting. Similarly, the phrase 'non-textable phone number' or 'untextable phone number' refers to a telephone number such as a PSTN phone number that corresponds to a handset and/or communication channel that do not natively support texting.

Figure 1:
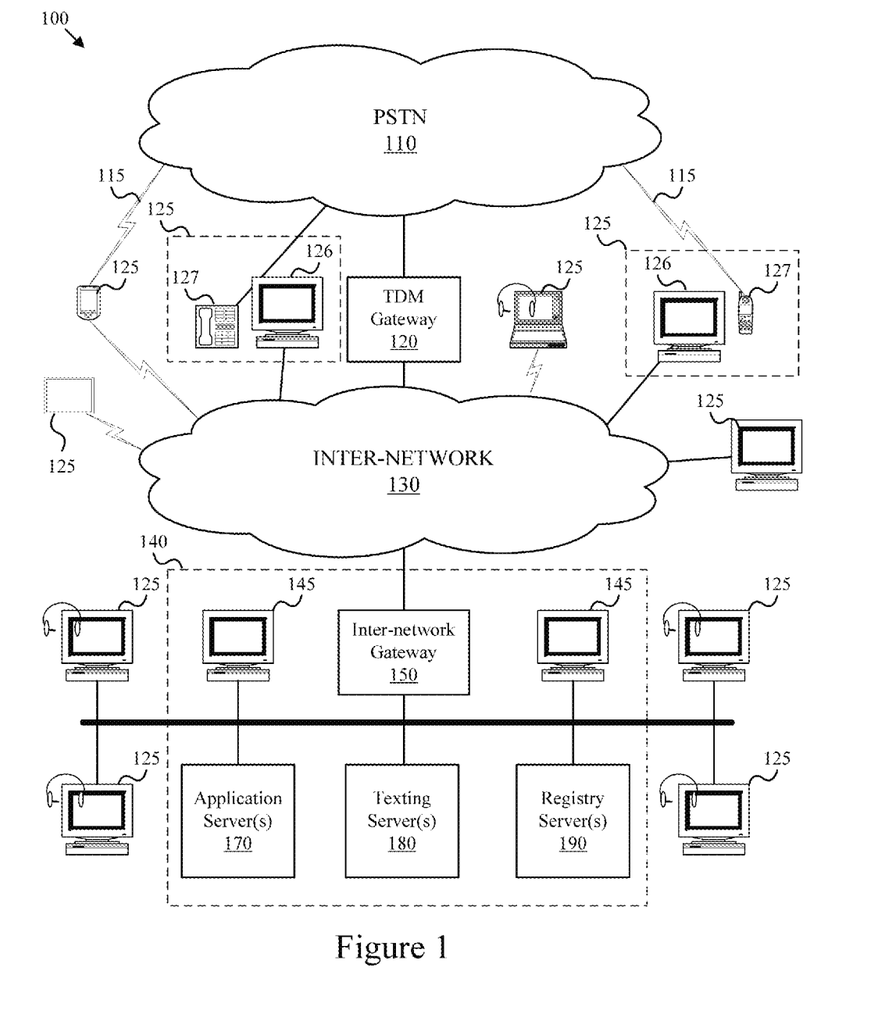
FIG. 1 is a block diagram depicting one example of a computing and communications infrastructure that is consistent with one or more embodiments of the claimed inventions.

FIG. 1 is a block diagram depicting one example of a computing and communications infrastructure 100 that is consistent with one or more embodiments of the claimed inventions. As depicted, the infrastructure 100 includes various systems, subsystems, and networks such as a public switched telephone network (PSTN) 110, a TDM gateway 120 connecting the PSTN to an inter-network 130, a variety of workstations 125, a data center 140 with administrative terminals 145, an inter-network gateway 150 connecting a local area network to the inter-network 130, and various servers such as application servers 170, texting servers 180, and registry servers 190. The infrastructure 100 is one example of components that can be operably interconnected to provide an infrastructure for providing texting services to non-textable phone numbers.

Each workstation 125 may include a separate computing device 126 and a communications device 127 or the computing device and communications device may integrated into the workstation 125. The computing devices 126 may enable browsing of web pages via the internetwork 130. The communications devices 127 may enable users to communicate with other users coupled to the PSTN 110.

The PSTN 110 may interconnect the communication devices 127 and enable users to make voice calls. The PSTN 110 may include various mobile phone networks (not shown) that enable mobile communication devices 127 (including mobile workstations 125 such as smartphones that incorporate a communication device 127) to access the PSTN 110 via wireless communications. Furthermore, the mobile phone networks within the PSTN may enable users of mobile communication devices 127 to communicate with each other via texting.

Typically, non-mobile communication devices 127 that attached to the PSTN 110 are analog devices or VOIP devices (that connect to the PSTN 110 via the inter-network 130) with untextable phone numbers that do not intrinsically support texting. Ironically, the PSTN 110 of many advanced nations has a greater installed base of untextable phone numbers than the PSTN of developing nations thus necessitating the features and advantages of the present invention.

The inter-network 130 may facilitate electronic communications between the various workstations and servers. In one embodiment, the inter-network 130 is the internet. In another embodiment, the inter-network 130 is a virtual private network (VPN).

Various servers such as blade servers within the data center 140 function cooperatively to enable texting to textable and untextable phone numbers. For example, the application servers 170 may provide one or more texting enabled applications and/or web pages to the local and remote users. Some users may have the texting enabled applications installed partially or wholly on their local computing devices 126.

The texting servers 180 may facilitate texting between the users through various channels or services such as e-mail services, instant messaging services, short message services, and similar services. The workstations 125 may leverage such services for user-to-user texting via the texting servers 180. Furthermore, individual users may have texting channels or services that can be leveraged when available.

The registry servers 190, or the like, store contact information for the various entities (e.g. individuals, businesses and institutions) that are able to communicate via texting even if those entities do not possess textable phone numbers.

Figure 2A:
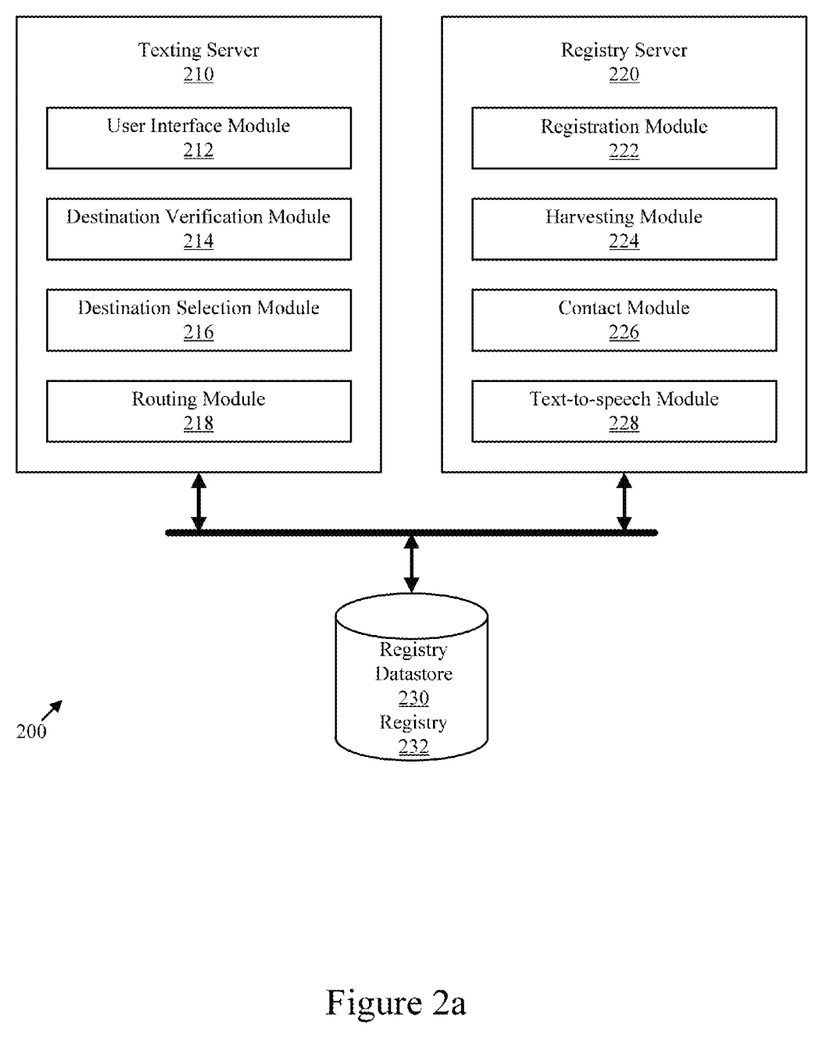
FIGS. 2a and 2b are block diagrams depicting one example of a texting system that is consistent with one or more embodiments of the claimed inventions.
Figure 2B:
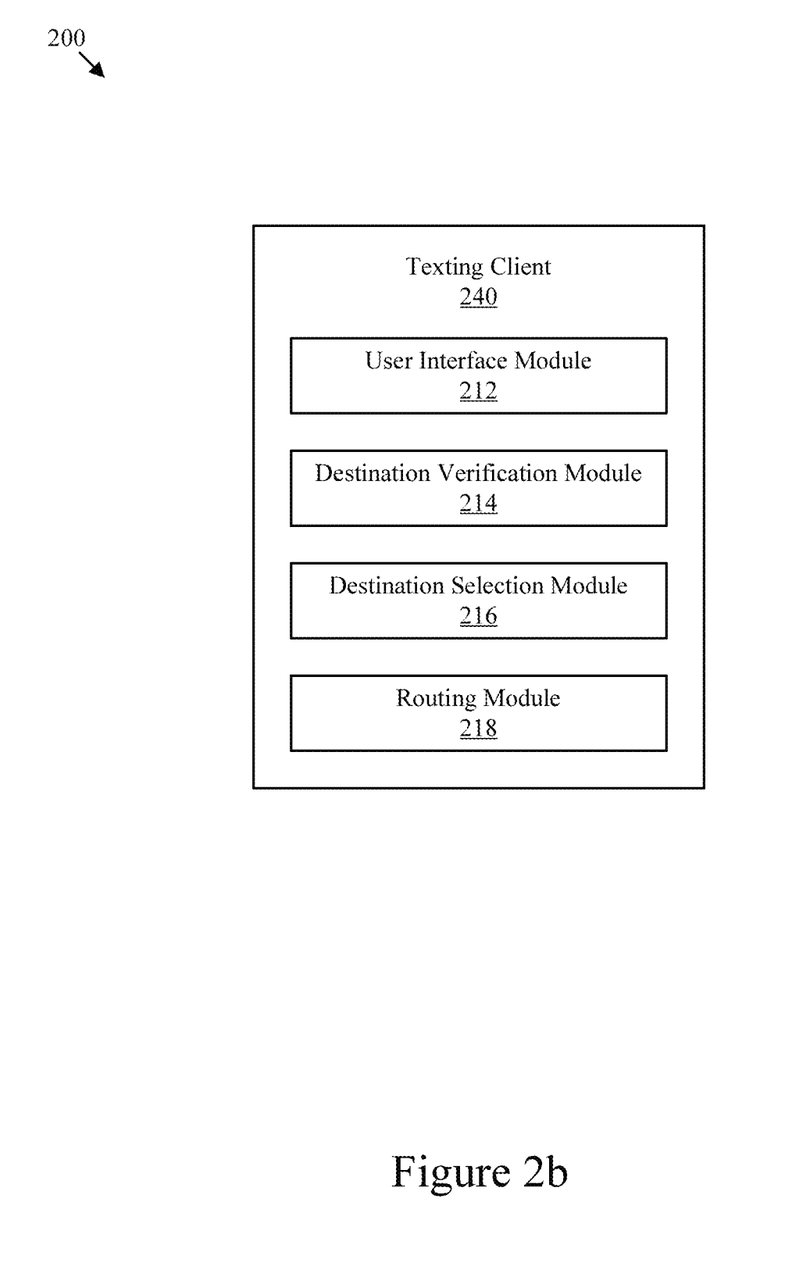

FIGS. 2*a* and 2*b* are block diagrams depicting one example of a texting system 200 that is consistent with one or more embodiments of the claimed inventions. As depicted, the texting system 200 includes a texting server 210, a registry server 220, a registry datastore 230 and a texting client 240. The system 200 may be housed in a datacenter such as the datacenter 140 or distributed on various digital processing devices that are connected to an inter-network such as the inter-network 130.

The texting server 210 and the texting client 240 may include a variety of modules that enable texting. In some embodiments, the modules are stored wholly or in part on various computer readable storage devices and loaded into various digital processing devices for execution. The depicted modules include a user interface module 212, a destination verification module 214, a destination selection module 216 and a routing module 218.

The texting server 210 and the texting client 240 may function cooperatively via the inter-network 130 and/or the PSTN 110. One of skill in the art will appreciate that although the texting server 210 and the texting client 240 may be (preferably) embodied as distinct devices, the depicted modules and other modules described herein may be partitioned across the texting server 210 and the texting client 240 in a variety of configurations and may be considered to be a single apparatus from a functional standpoint.

The registration server 220 may include a variety of modules that enable registration of users of texting services and phone numbers associated with such services. For example, the registry server may be configured to serve up one or more registration web pages that enable users to submit a texting address that is to be associated with a voice grade telephone number.

The registry datastore 230 may store a registry 232 of entities such as businesses and individuals that use texting services. The registry 232 may include a variety of information associated with the entities that use texting services. Examples of such information include a texting address, contact information and other data associated with the entities that use texting services. The texting address associated with each entity may be an electronic messaging address such as an email address or an instant messaging user ID and need not be limited to textable phone numbers.

Referring to the texting server 210 and the texting client 240, the user interface module 212 may enable users to send and receive text messages. The text messages may have a telephone number or some other information such as a business name embedded in a destination field of the text message. The telephone number may be a voice grade telephone number. The telephone number may be associated with a geographic region or a particular category of service.

The destination verification module 214 may access the registry 232 to determine if a texting address is associated with the contents of the destination field. The routing module 218 may subsequently route each text message to the texting address if a texting address is associated with the contents of the destination field. The texting address may be a textable phone number, or an electronic messaging address such as an email address or instant messaging address, or the like. In some embodiments, the routing module 218 may leverage the texting channels of the user device in order to transmit SMS messages (or the like) via the user device for destinations that are associated with textable phone numbers.

If more that one texting address is associated with the contents of the destination field, the destination selection module 216 may automatically select, or enable a user to manually select, the preferred texting address from a list of matching texting addresses and/or descriptors. In certain embodiments, the destination selection module 216 selects the preferred texting address based on the contents of the text message. For example, the destination selection module 216 may select a texting address for an electronics department of a business if the contents of the text message relate to electronics.

The depicted registration server 220 includes a registration module 222, a harvesting module 224, a contact module 226 and a text-to-speech module 228. The registration module 222 may manage access to the registry 232 and facilitate inserting data into, or retrieving data from, the registry 232. The registry 232 may be cached locally on the registry server 220 and stored partially or wholly within the datastore 230.

The harvesting module 224 may harvest contact information for various entities from web pages, electronic listings, public databases, or the like. The contact information may include contact addresses that may be used as a texting addresses such as email addresses and instant messaging addresses.

The contact module 226 may use the harvested contact information to invite various entities to register within the registry 232. Invitations may be sent to entities through a variety of communication means such as email, instant messaging, texting, automated phone dialogs, postal mail, and the like. The registration invitation may include a registration pin that can be used to uniquely identify an entity on a registration web page or during a call to a registration phone number. In some embodiments, the text-to-speech module 228 may be leveraged to invite entities to register via an interactive voice dialog. In certain embodiments, the contact module 226 comprises a dialer that may be leveraged to connect entities with available customer support personnel, the text-to-speech module 228, or the like.

One of skill in the art will appreciate that extending invitations to entities to register within the registry 232 may dramatically increase the number of entities that are registered to use texting services. As a result, the reach, availability, and usefulness of such texting services may be significantly advanced. One of skill in the art will also appreciate that the various modules depicted in FIGS. 2*a* and 2*b* may reside partially or wholly within user devices such as mobile devices and desktop devices or distributed amongst multiple nodes in a cloud computing environment or the like.

Figure 3:
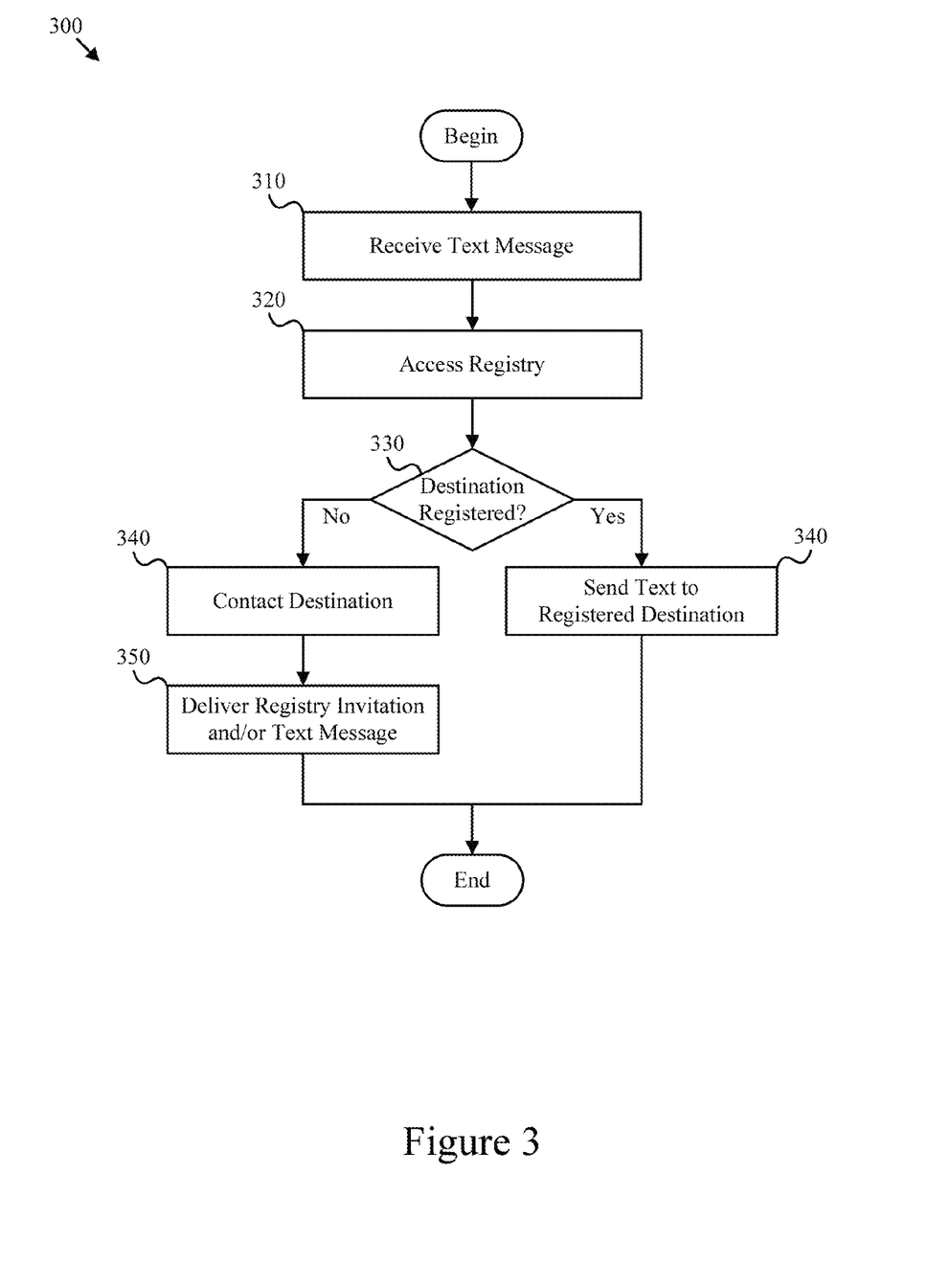
FIG. 3 is a flowchart diagram depicting one example of a texting method that is consistent with one or more embodiments of the claimed inventions.

FIG. 3 is a flowchart diagram depicting one example of a texting method 300 that is consistent with one or more embodiments of the claimed inventions. As depicted, the texting method 300 includes receiving 310 a text message, accessing 320 a texting registry, determining 330 if a destination for the text message is registered, and sending 340 the text message. The texting method 300 may also include contacting 340 the destination and delivering 350 a registry invitation and/or the text message. The texting method 300 may be used to provide texting services to textable and untextable phone numbers. The texting method 300 may be executed by the texting server 210 and/or a user device associated with such a server.

Receiving 310 a text message may include receiving a text from a user application or the like. The user application may reside on a variety of devices such a mobile devices and desktop devices. Subsequently, the method is advanced by accessing 320 a texting registry such as the registry 232 and determining 330 if the contents of the destination field for the text message matches an entity that is registered within the texting registry.

If the contents of the destination field matches a registered entity, the texting method 300 may be advanced by sending 340 the text message to the registered entity. In one embodiment, if the contents of the destination field matches multiple entities (i.e. an ambiguous match) a selection list is provided to the user application and a user of the user application is enabled to select the intended destination. Subsequently, the text message is sent to the intended destination in response to selection of the intended destination.

If the contents of the destination field does not match a registered entity, the texting method 300 may be advanced by contacting 340 the destination and delivering 350 a registry invitation and/or the text message. For example, an electronic message, voice message, or postal letter may be sent to the destination informing them that a party was attempting to contact them via a text message. The electronic message, voice message, or postal letter may include the contents of the text message and invite an entity associated with the destination to register with the texting system 300 in order to respond to the text message and receive future text messages.

One of skill in the art will appreciate that informing an entity of actual attempts to send text messages provides a compelling motivation to register with the texting system 200 and thereby extend the reach, availability, and usefulness of texting services far beyond what is currently attainable.

One of skill in the art will also appreciate that the operations depicted in FIG. 3 and in other Figures included herein need not be executed in the depicted order. For example, in one embodiment access to the registry 232 or the like may occur before an actual email message is sent. For example, the registry 232 may be accessed in response to a user editing the destination field within a message editor or the like. Consequently, the information provided by the user within such a field can be used to retrieve and disambiguate an intended destination and the corresponding texting address previous to transmission of a texting message. In yet another embodiment, a user is informed if the contents of the destination field does not resolve to a texting address.

Figure 4:
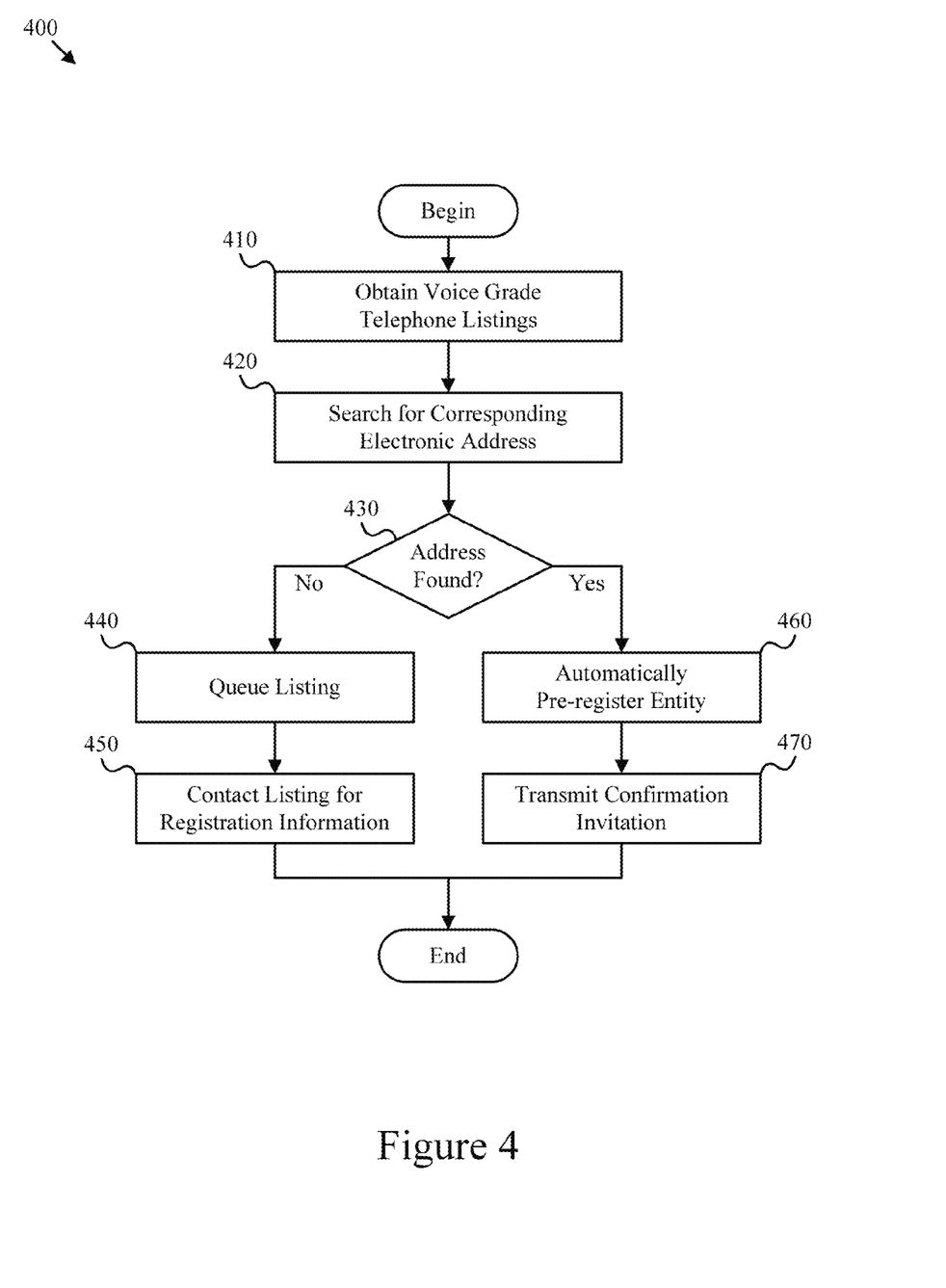
FIG. 4 is a flowchart diagram depicting one example of a registration method that is consistent with one or more embodiments of the claimed inventions.

FIG. 4 is a flowchart diagram depicting one example of a registration method 400 that is consistent with one or more embodiments of the claimed inventions. As depicted, the registration method 400 includes obtaining 410 voice grade telephone listings, searching 420 for a corresponding electronic address, determining 430 if an electronic address has been found, queuing 440 a listing, contacting 450 an entity associated with a listing for registration information, pre-registering 460 an entity, and transmitting 470 a confirmation invitation.

Obtaining 410 voice grade telephone listings may include obtaining a database of telephone listings associated with a geographic region such as white pages listings, yellow pages listings, or the like. Searching 420 for a corresponding electronic address may include conducting an internet search of web pages that reference a particular telephone number and extracting a corresponding electronic address such as an email address.

If a corresponding electronic address is found the method may be advanced by pre-registering 460 an entity and transmitting 470 a confirmation invitation to the entity via the electronic address. Upon reception of a confirmation message from the entity, the registration may be finalized within the registry 232.

If a corresponding electronic address is not found the method may be advanced by queuing 440 a listing and subsequently contacting 450 an entity associated with a listing for registration information.

Figure 5:
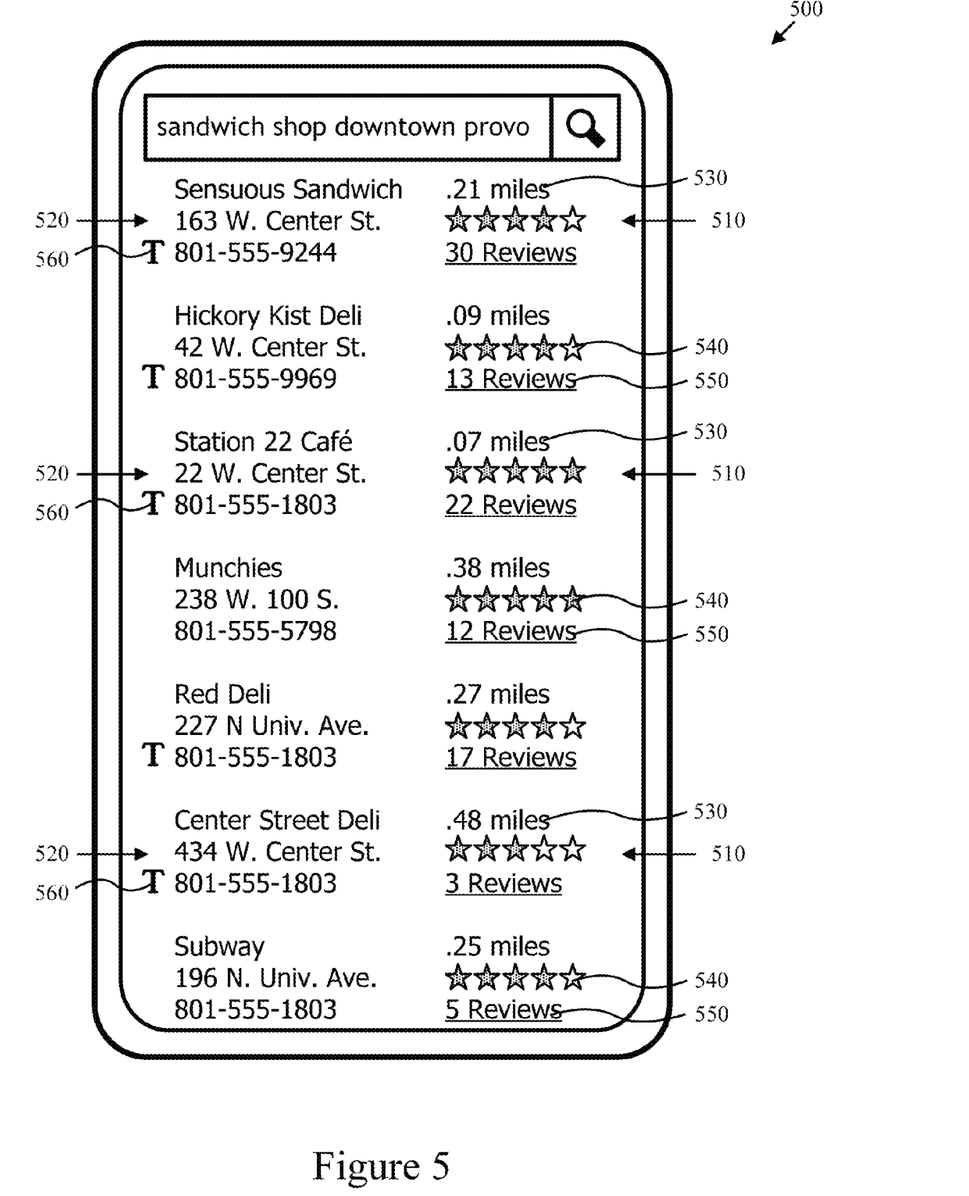
FIG. 5 is graphical diagram depicting one example of a listing interface that is consistent with one or more embodiments of the claimed inventions.

FIG. 5 is graphical diagram depicting one example of a listing interface 500 that is consistent with one or more embodiments of the claimed inventions. As depicted, the listing interface 500 includes a variety of listings 510 with entity contact information 520, distance information 530, review information 540, and a review link 550. The listing interface 500 also includes a textable indicator 560 which enables a user to know which entities can be contacted via texting (i.e. are textable entities) regardless of whether those entities actually possess a textable phone number.

In some embodiments, the user interface module 212 or the like parses the information to be displayed to identify telephone numbers. For example, the listings 510 may be embedded in a web page that is parsed to identify telephone numbers that are included therein. In other embodiments, the location of each telephone number is identified by formatting codes. In response to identifying telephone numbers, the destination verification module 214 or the like may access a texting registry to determine if a texting address is associated with each identified telephone number. If a texting address is associated with an indentified telephone number, the textable indicator 560 may be displayed proximate to the telephone number or other contact information for the corresponding entity.

The textable indicator may be any suitable indicator such as an icon, a symbol, a graphic, a display character or a sequence of display characters. In some embodiments, clicking or selecting the textable indicator 560 proximate to the entity contact information 520, activates a texting interface (not shown) that enables a user to have a texting dialog with the selected entity. However, one of skill in the art will appreciate that a texting interface for communicating with a textable entity could be activated via a variety of mechanisms (e.g. voice commands) some of which may not be currently known in the art.

Figure 6:
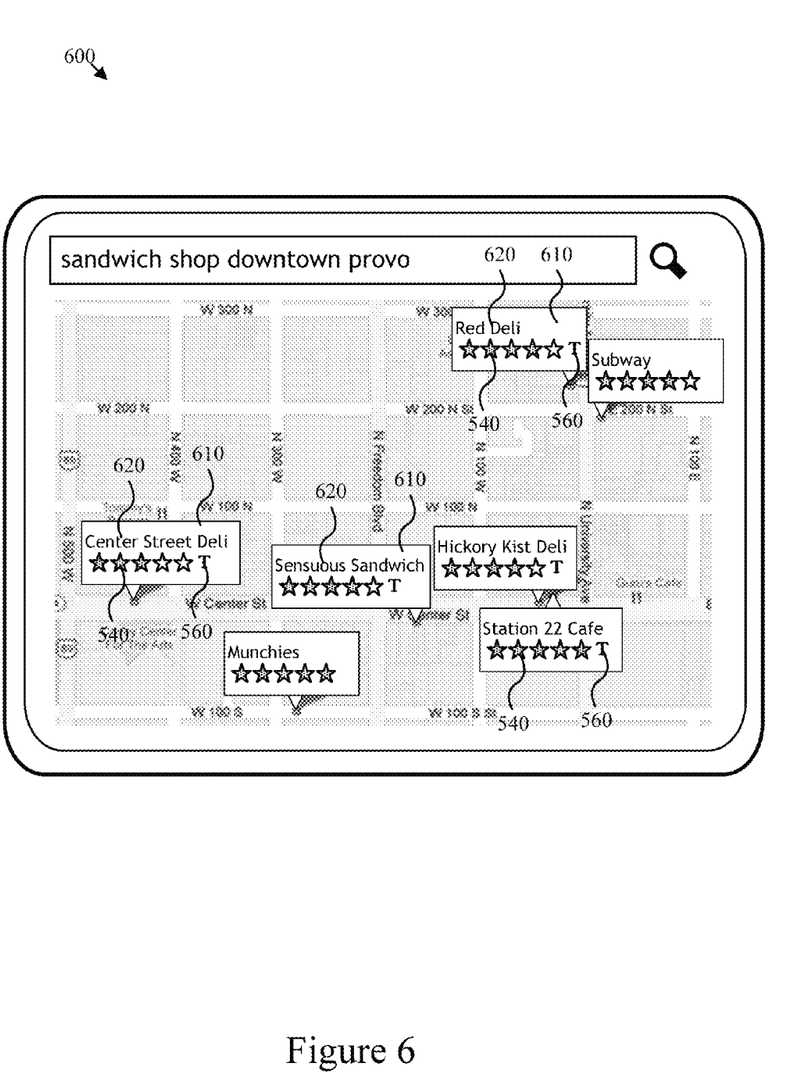
FIG. 6 is graphical diagram depicting one example of a map interface that is consistent with one or more embodiments of the claimed inventions.

FIG. 6 is graphical diagram depicting one example of a map interface 600 that is consistent with one or more embodiments of the claimed inventions. As depicted, the map interface 600 includes a variety of graphical indicators 610 with an entity name 620, review information 540, and the textable indicator 560 overlayed thereon. Similar to the listing interface 500, the map interface 600 enables a user to know which entities can be contacted via text messaging regardless of whether those entities actually possess a textable phone number.

In the depicted embodiment, the textable indicator 560 is proximate to the entity name 620 and clicking or selecting the textable indicator 560 activates a texting interface (not shown) that enables a user to have a texting dialog with the selected entity. However, activation of a texting interface is not limited to the depicted embodiment.

Figure 7:
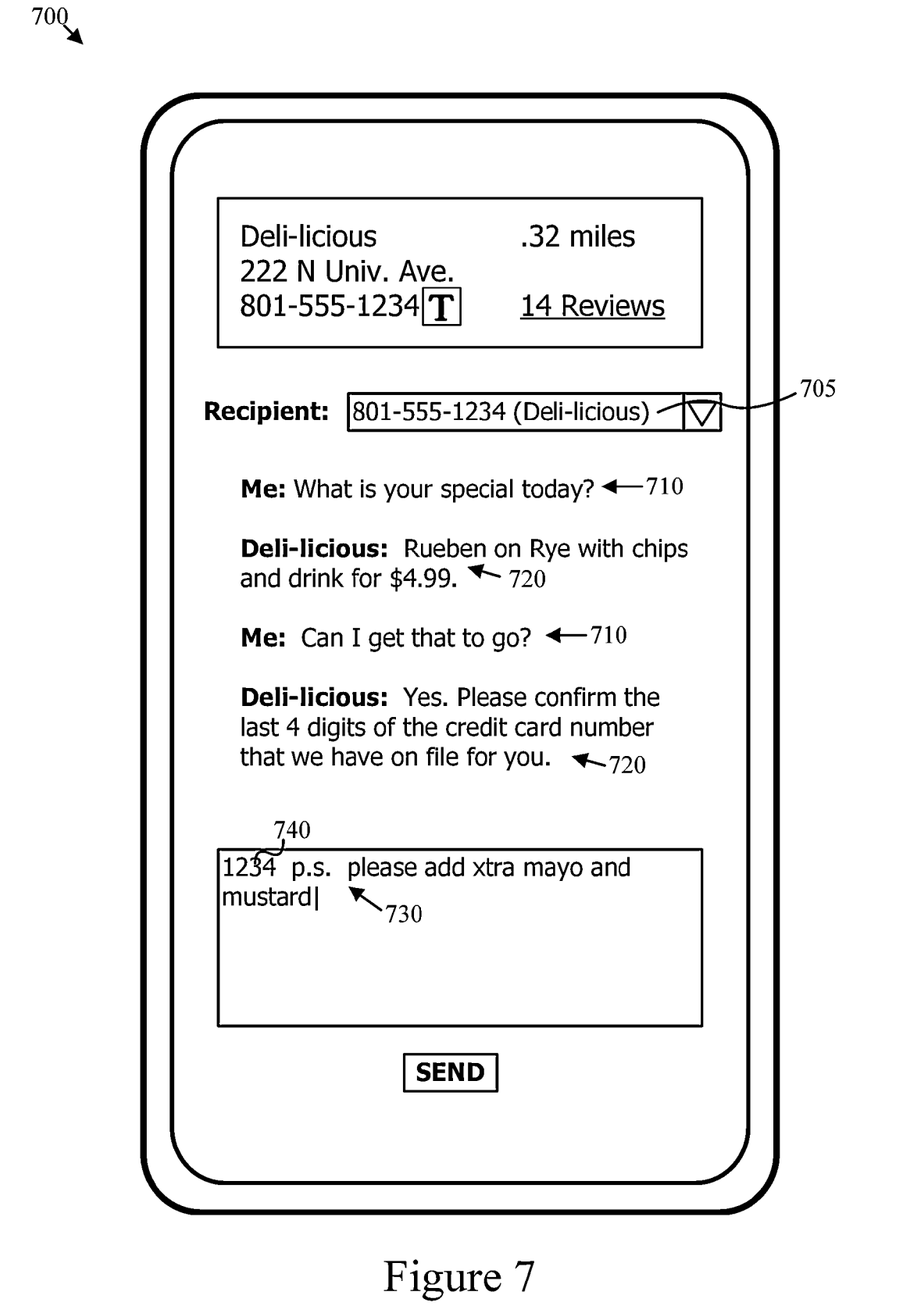
FIG. 7 is graphical diagram depicting one example of a texting dialog that is consistent with one or more embodiments of the claimed inventions.

FIG. 7 is graphical diagram depicting one example of a texting interface or dialog 700 that is consistent with one or more embodiments of the claimed inventions. The texting dialog 700 includes a recipient or destination field 705, a number of user transmissions 710, entity responses 720, and a message editing field 730. The texting dialog 700 shows how the texting system 200 can be leveraged to conduct commerce via texting.

The recipient or destination field 705 enables a user to specify a destination address for the text message(s). In some embodiments, the contents of the field 705 are used to access a texting registry which verifies that the contents correspond to an entity with a texting address. In one embodiment, if the contents of the field 705 correspond to more that one entity the field a drop down list is provided (not completely shown) to the user with descriptors for entities that match the contents of the destination field.

The credit card number of the user and/or a confirmation code may be known to the entity that receives the user transmissions or by the texting system 200. In some embodiments, user credit card numbers and/or confirmation codes are be stored in the registry 232 and associated with a corresponding entity. Consequently, the user may be able to confirm the transaction with via a confirmation code 740 which can subsequently be validated by the entity. In the depicted embodiment, the confirmation code is explicitly transmitted by the user. In another embodiment, the user initiates transmission of the confirmation code by activating a 'confirm' button or the like. In some embodiments, payments to entities from users are automatically handled by the system 200 in response to a transaction that is confirmed by the user.

Figure 8:
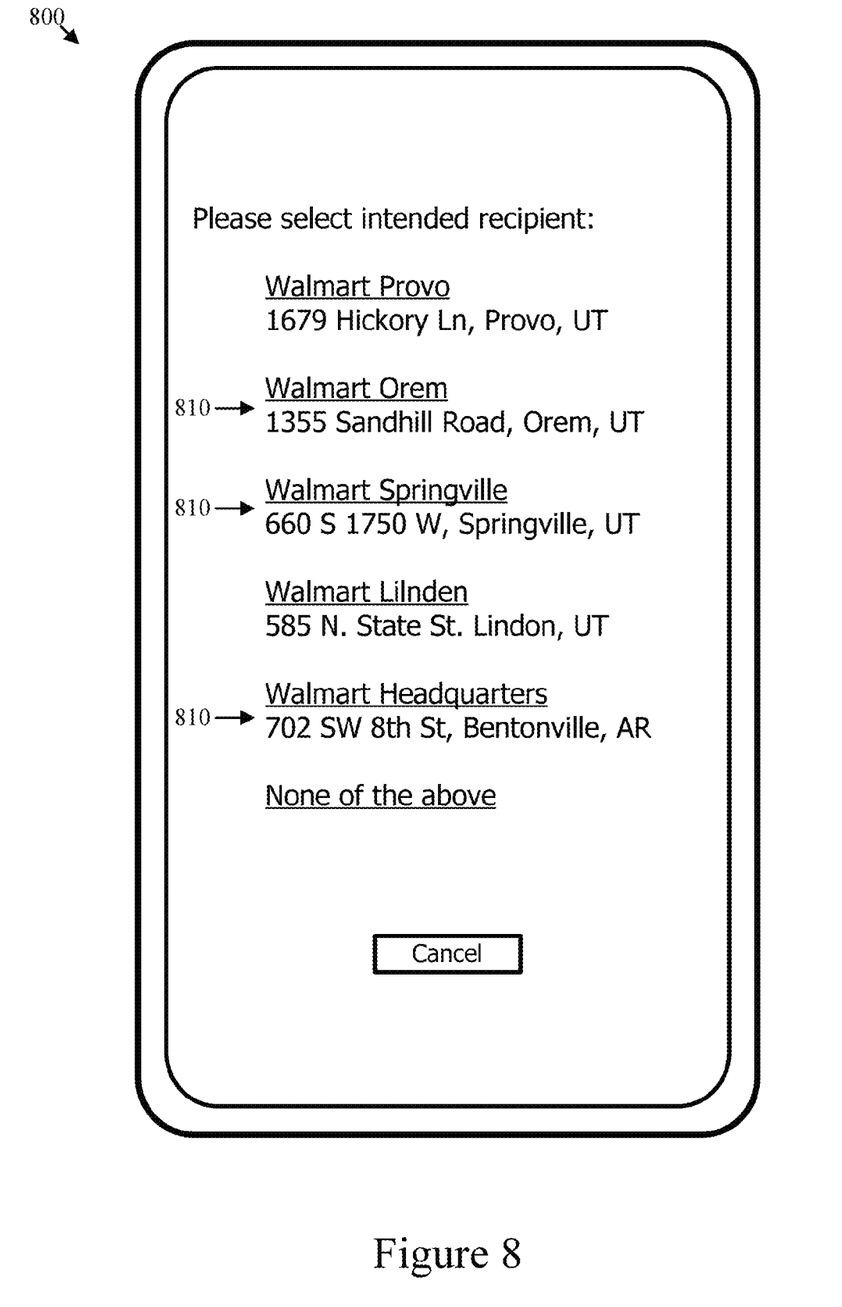
FIG. 8 is graphical diagram depicting one example of a destination selection dialog that is consistent with one or more embodiments of the claimed inventions.

FIG. 8 is graphical diagram depicting one example of a destination selection dialog 800 that is consistent with one or more embodiments of the claimed inventions. As depicted, the destination selection dialog 800 includes a variety of entity listings 810 that enable disambiguation of an intended destination. For example, when the contents of the destination field of a transmitted or pending text message matches multiple entities (i.e. an ambiguous match) as described above, a selection list or the like may be provided to the user to enable the user to select the intended destination. Subsequently, the text message may be sent to the intended destination in response to selection of the intended destination and/or entry of the text message by the user.

The proceeding depiction of the texting system 200 and other inventive elements described herein are intended to be illustrative rather than definitive. Similarly, the claimed invention may be embodied in other specific forms without departing from its spirit or essential characteristics. For example, the modules of an apparatus claim may be distributed across multiple physical devices such as a client device and a server device while retaining the essence of the claimed apparatus. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to provide texting services for telephone numbers including published telephone numbers and voice grade telephone numbers, the method comprising a plurality of operations including:
    parsing information associated with a user display for a telephone number;
    accessing a texting registry comprising contact information for a plurality of entities associated with a geographic region, the contact information comprising a contact telephone number for each entity of the plurality of entities;
    determining if the telephone number matches a contact telephone number within the registry;
    determining if a texting address is associated with the contact telephone number; and
    initiating display of a textable indicator proximate to the telephone number on the user display when the telephone number matches a contact telephone number within the registry and a texting address is associated with the contact telephone number;
    wherein the plurality of operations are performed by at least one digital processing apparatus.

2. The method of claim 1, further comprising initiating display of a different indicator proximate to the telephone number on the user display when the telephone number matches a published telephone number and a texting address is not associated with the published telephone number.

3. The method of claim 1, wherein the textable indicator is selected from the group consisting of an icon, a symbol, a graphic, a display character, and a sequence of display characters.

4. The method of claim 1, further comprising activating a text messaging interface in response to user selection of the textable indicator.

5. The method of claim 1, wherein the contact phone number is a published telephone number.

6. An apparatus to provide texting services for telephone numbers including published telephone numbers and voice grade telephone numbers, the apparatus comprising:
    a user interface module configured to parse information associated with a user display for a telephone number;
    a destination verification module configured to access a texting registry comprising contact information for a plurality of entities associated with a geographic region, the contact information comprising a contact telephone number for each entity of the plurality of entities;
    the destination verification module further configured to determine if the telephone number matches a contact telephone number within the registry;
    the destination verification module further configured to determining if a texting address is associated with the contact telephone number;
    the user interface module further configured to display a textable indicator proximate to the telephone number on the user display when the telephone number matches a contact telephone number within the registry and a texting address is associated with the contact telephone number; and
    at least one digital processing apparatus configured to execute the user interface module and the destination verification module.

7. The apparatus of claim 6, wherein the user interface module is further configured to display a different indicator proximate to the telephone number on the user display when the telephone number matches a published telephone number and a texting address is not associated with the published telephone number.

8. The apparatus of claim 6, wherein the textable indicator is selected from the group consisting of an icon, a symbol, a graphic, a display character, and a sequence of display characters.

9. The apparatus of claim 6, wherein the user interface module is further configured to activate a text messaging interface in response to user selection of the textable indicator.

10. The apparatus of claim 6, wherein the contact phone number is a published telephone number.

11. A method to provide texting services for telephone numbers including published telephone numbers and voice grade telephone numbers, the method comprising a plurality of operations including:
receiving a telephone number from a client;
accessing a texting registry comprising contact information for a plurality of entities associated with a geographic region, the contact information comprising a contact telephone number for each entity of the plurality of entities;
determining if the telephone number matches a contact telephone number within the registry;
determining if a texting address is associated with the contact telephone number; and
providing the texting address to the client when the telephone number matches a contact telephone number within the registry and a texting address is associated with the contact telephone number,
wherein the plurality of operations are performed by at least one digital processing apparatus.

12. The method of claim 11, wherein the client is selected from the group consisting of a user, an application, and a device.

13. An apparatus to provide texting services for telephone numbers including published telephone numbers and voice grade telephone numbers, the apparatus comprising a plurality of modules including:
a user interface module configured to receive a telephone number from a client;
a destination verification module configured to access a texting registry comprising contact information for a plurality of entities associated with a geographic region, the contact information comprising a contact telephone number for each entity of the plurality of entities;
the destination verification module further configured to determine if the telephone number matches a contact telephone number within the registry;
the destination verification module further configured to determine if a texting address is associated with the contact telephone number; and
the user interface module further configured to provide the texting address to the client when the telephone number matches a contact telephone number within the registry and a texting address is associated with the contact telephone number; and
at least one digital processing apparatus configured to execute the user interface module and the destination verification module.

14. The apparatus of claim 13, wherein the client is selected from the group consisting of a user, an application, and a device.

15. A method to provide texting services for telephone numbers including published telephone numbers and voice grade telephone numbers, the method comprising a plurality of operations including:
receiving a text message from a user, the text message comprising a destination address field;
accessing a registry comprising contact information for a plurality of entities associated with a geographic region, the contact information comprising a contact phone number for each entity of the plurality of entities;
determining a selected entity if the destination address field unambiguously matches contact information for an entity within the registry;
determining if the contact information comprises a texting address;
sending the text message to the texting address when the destination address field unambiguously matches contact information for an entity within the registry and the contact information comprises a texting address;
wherein the plurality of operations are performed by at least one digital processing apparatus.

16. The method of claim 15, further comprising enabling a user to confirm the selected entity.

17. The method of claim 15, further comprising enabling a user to manually select the selected entity from a plurality of listed entities when the destination field ambiguously matches contact information for at least one entity within the registry.

18. The method of claim 15, wherein the plurality of entities comprise an entity selected from the group consisting of a business, an enterprise, a service organization, a residence, and a person.

19. The method of claim 15, wherein the destination address field comprises a published telephone number.

20. The method of claim 15, wherein the texting address is provided to the registry by a user accessing a registration web site.

21. The method of claim 15, further comprising appending geo-location meta-data to the text message.

22. The method of claim 15, wherein the texting address is harvested from a web site associated with a business within the geographic region.

23. The method of claim 15, further comprising sending a registration message to the texting address.

24. The method of claim 15, wherein the registration message comprises a registration pin.

25. The method of claim 15, wherein the voice grade telephone phone number is harvested from the web site.

26. The method of claim 15, further comprising calling the phone number when a texting address is not associated with the phone number.

27. The method of claim 15, further comprising inviting an answering party to register the voice grade telephone number.

28. The method of claim 15, further comprising providing a registration pin to an answering party.

29. The method of claim 15, further comprising inviting the answering party to call a registration phone number.

30. The method of claim 15, further comprising inviting the answering party to access a registration web site.

31. The method of claim 15, further comprising converting the text message to audible speech.

32. The method of claim 15, further comprising selecting the texting address from a plurality of texting addresses associated with the phone number based on content of the text message.

33. The method of claim 15, wherein the texting address is selected from the group consisting of an email address, a textable phone number and an instant messaging User ID.

34. An apparatus to provide texting services for telephone numbers including published telephone numbers and voice grade telephone numbers, the apparatus comprising:
a registration module configured to manage a registry of phone numbers associated with a geographic region, the phone numbers comprising voice grade telephone numbers;
a user interface module configured to receive a text message for a voice grade telephone from a user;
a destination verification module configured to access the registry to determine if a texting address is registered for the voice grade telephone number;

a routing module configured to send the text message to the texting address when a texting address is associated with the voice grade telephone number; and at least one digital processing apparatus configured to execute the registration module, the user interface module, the destination verification module and the routing module.

35. The apparatus of claim 34, further comprising a registry server configured to serve a registration web page that enables a user to submit the texting address for the voice grade telephone number.

36. The apparatus of claim 34, further comprising a harvesting module configured to harvest the texting address from a web site.

37. The apparatus of claim 34, further comprising a contact module configured to send a registration message to the texting address.

38. The apparatus of claim 34, wherein the registration message comprises a registration pin.

39. The apparatus of claim 34, wherein the voice grade telephone phone number is harvested from the web site.

40. The apparatus of claim 34, further comprising a contact module configured to call the phone number if a texting address is not associated with the phone number.

41. The apparatus of claim 34, wherein the contact module is further configured to invite an answering party to register the voice grade telephone number.

42. The apparatus of claim 34, further comprising a text-to-speech module configured to convert the text message to audible speech.

43. The apparatus of claim 34, further comprising a destination selection module configured to select the texting address from a plurality of texting addresss associated with the phone number based on content of the text message.

44. The apparatus of claim 34, wherein the texting address is selected from the group consisting of an email address, a textable phone number and an instant messaging User ID.

* * * * *